UNITED STATES PATENT OFFICE.

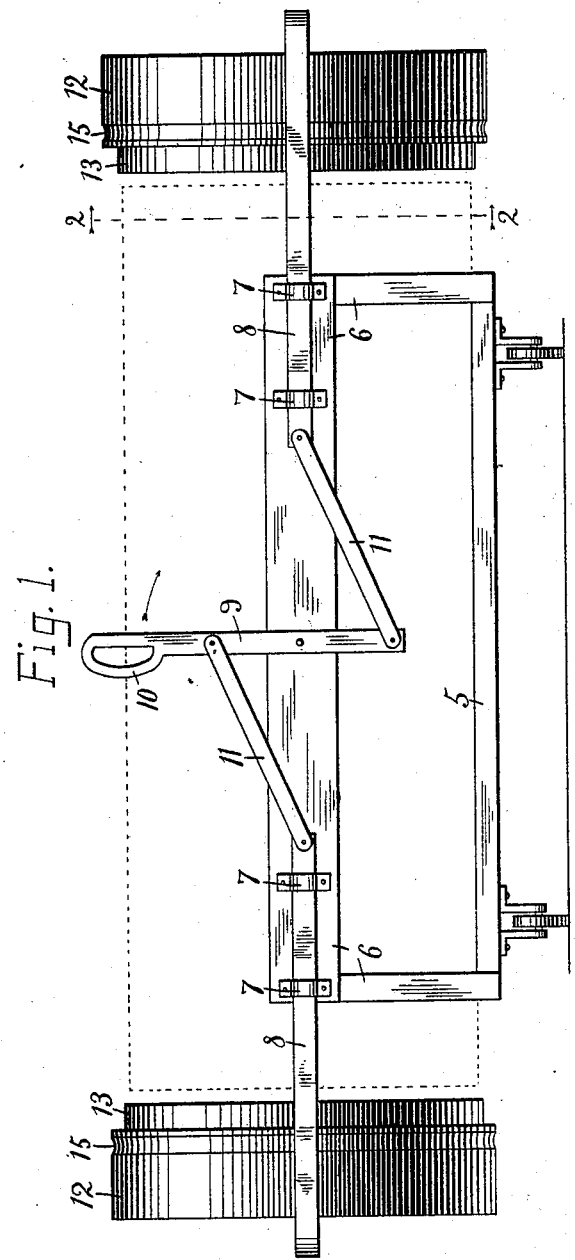

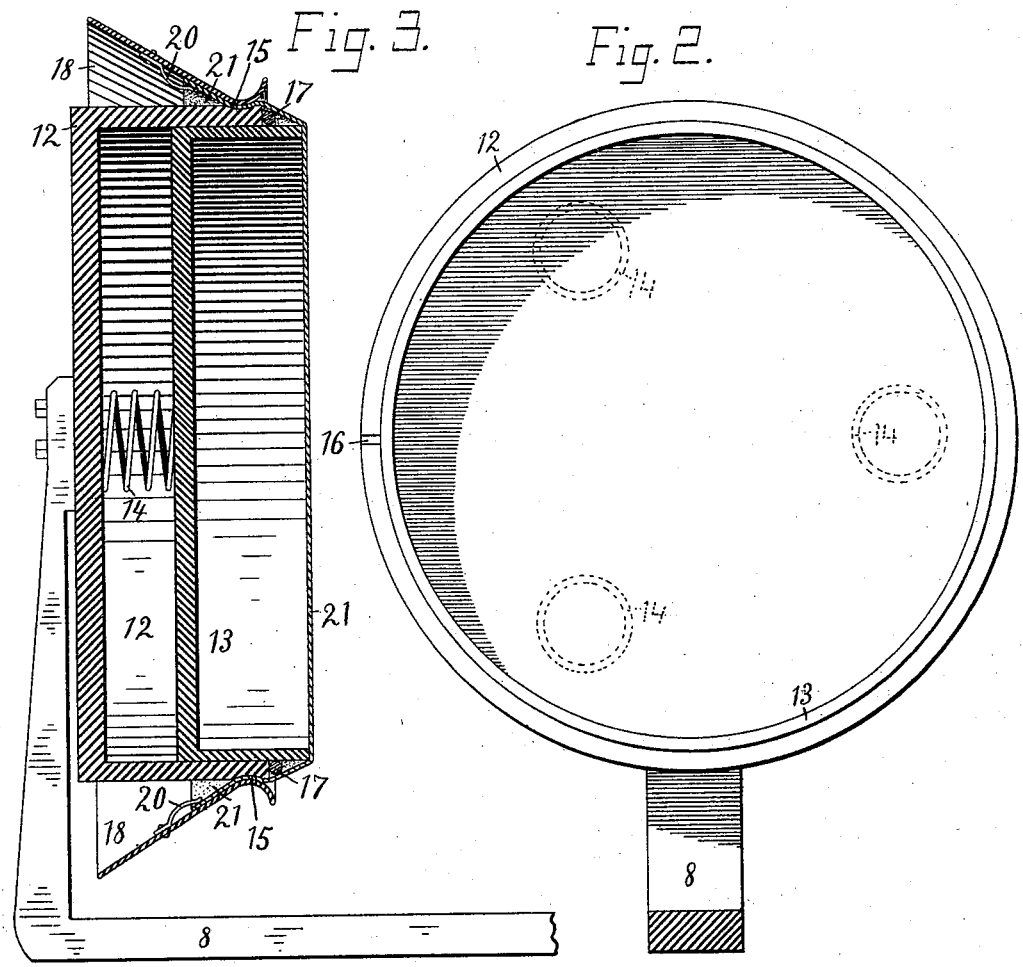

JAMES F. SWINNERTON, OF ST. LOUIS, MISSOURI, ASSIGNOR TO THE KINGSLAND & DOUGLAS MANUFACTURING COMPANY, OF SAME PLACE.

DEVICE FOR APPLYING END CAPS TO CYLINDRICAL BALES.

SPECIFICATION forming part of Letters Patent No. 594,663, dated November 30, 1897.

Application filed October 28, 1895. Serial No. 567,184. (No model.)

*To all whom it may concern:*

Be it known that I, JAMES F. SWINNERTON, a citizen of the United States, residing at the city of St. Louis, in the State of Missouri, have invented a certain new and useful Device for Applying End Caps to Cylindrical Bales, of which the following is such a full, clear, and exact description as will enable any one skilled in the art to which it appertains to make and use the same, reference being had to the accompanying drawings, forming part of this specification.

My invention relates to a new and useful device for applying end caps to cylindrical bales of cotton or other material.

The object of my invention is to provide a device by means of which caps for protecting the ends of cylindrical bales can be quickly and easily applied to the bale, and also to obviate the necessity of forming a hem in the edge of the cap and inserting the securing-wire in this hem.

My invention consists in the various novel features and details of construction set forth in the following specification, and pointed out in the claims affixed hereto.

In the accompanying drawings, which illustrate a device embodying one form of my invention, Figure 1 is a side elevation; Fig. 2, an enlarged sectional view on the line 2 2 of Fig. 1; and Fig. 3, a horizontal sectional view, also on an enlarged scale, of the parts shown in Fig. 2, with the addition of the material for forming the cap and devices for holding it in position.

Like marks of reference refer to similar parts in the several views of the drawings.

5, Fig. 1, is a suitable car or truck, to one side of which is secured a frame 6. On the frame 6 are mounted guides 7, in which slide two L-shaped arms 8. Pivoted to the frame 6 is a lever 9, provided with a suitable handle 10. Connecting the lever 9 with the arms 8 are two links 11, so that by moving the lever 9 in one or the other direction the arms 8 can be made to simultaneously approach toward or recede from each other. To the arms 8 are secured the two devices for applying the end caps to the bale. As these two devices are exactly alike, only one need be described.

12 is a short cylinder closed at one end, which is bolted or otherwise suitably secured to the arm 8. Fitting in the cylinder 12 is a similar short cylinder 13, also closed at one end, the inside diameter of which is just sufficient to fit loosely over the end of the bale to which the cap is to be applied. Interposed between the ends of the cylinder 12 and 13 are coil-springs 14, of which I have shown three, but any suitable number may be used. These springs 14 keep the cylinder 13 normally projected slightly beyond the cylinder 12, but allow the cylinder 13 to be forced completely within the said cylinder 12 by the application of pressure.

15 is a shallow groove (best shown in Fig. 1) formed around the periphery of the cylinder 12 and near its edge. In the top of the cylinder 12 is also formed a slot 16, Fig. 2, for receiving the free ends of the securing or tie wire 17, Fig. 3.

18, Fig. 3, is a funnel-shaped piece of sheet metal, the small end of which is slightly flared or bell-shaped, thus forming a rounded portion which seats lightly in the groove 15 when the piece 18 is drawn over the cylinder 12. To the inner surface of the part 18 are secured a series of spring-clamps 20, for holding circular piece of canvas or other material 21, which is to form the cap for the bale.

The operation of my device is as follows: The tie-wire 17, cut to a suitable length, is first placed around the projecting portion of the cylinder 13 and against the shoulder formed by the edge of the cylinder 12. The free ends of the wire 17 are bent into the slot 16 to hold the wire in position. The circular piece of canvas or other suitable material 21 for forming the cap is now secured to the funnel-shaped part 18 by means of the spring-clamps 20. The part 18, together with the attached canvas, is now drawn over the cylinder 12 until the rounded portion seats in the groove 15. The several parts are now in the position shown in Fig. 3. The corresponding parts at the opposite end of the device are of course arranged in the same manner. The bale (shown in dotted lines in Fig. 1) is then placed on the truck 5 in position to receive the caps. The lever 9 is now moved in the direction indicated by the arrow, Fig. 1, and the two cylinders 12, together with their attached parts, thus caused to approach each other. By this movement the cylinder 13 is forced over the end of the bale and the canvas 21 thus forced into the cylinder 13 and around the end of the bale. At the same time the canvas is drawn from the spring-clamps 20 and finally completely out of the funnel-shaped part 18. The further movement of the parts causes the cylinders 12 and 13 to telescope, and the tie-wire 17 is thus forced past the end of the cylinder 13 and into position for securing the cap. The free ends of the wire are now removed from the slot 16 and the wire drawn tightly around the bale and the ends secured by twisting or in any other well-known way. The cylinders 12 and their attached parts are then carried free from the bale by a movement of the lever 9 in the opposite direction to that previously described. The bale is now ready to be removed and the operation repeated.

I have shown my device mounted on a wheeled car or truck, as I consider that as the best and most convenient way, but, if so desired, it may be mounted on a stationary platform.

It is also obvious that many other devices besides the lever and links shown may be used to cause the parts to approach toward and recede from each other—such, for instance, as rack-and-pinion gearing.

Having fully set forth my invention, what I desire to claim as new and to secure by Letters Patent of the United States is—

1. In a device for applying end caps to cylindrical bales and the like, an outer cylindrical member adapted at one end to support an end cap of flexible material, and an inner cylindrical member slidingly mounted in the said outer member and adapted to be telescoped therein by the bale, whereby the end cap will be applied to the bale.

2. In a device for applying end caps to cylindrical bales or the like, a movable member adapted to slide over the ends of the bale, means for removably securing a piece of flexible material to said movable member, and means for actuating said movable member.

3. In a device for applying end caps to cylindrical bales and the like, two cap-holders adapted to slide over the end of the bale mounted on a suitable frame, means for removably securing a piece of flexible material to each of said cap-holders, and suitable actuating mechanism for causing said cap-holders simultaneously to approach toward or recede from each other.

4. In a device for applying end caps to cylindrical bales and the like, a movable member, means for actuating said movable member, means for removably securing a piece of flexible material to said movable member, and a second member carried by said movable member and adapted to telescope within it, said second member being adapted to slide over the end of the bale.

5. In a device for applying end caps to cylindrical bales and the like, a cylindrical member, a second cylindrical member carried by said first-named cylindrical member and telescoping within it, and a suitable spring or springs normally projecting said second cylindrical member beyond said first cylindrical member, whereby a suitable space is formed for the reception of a tie-wire.

6. In a device for applying end caps to cylindrical bales and the like, a movable cylindrical member, means for actuating said movable member, means for removably securing a piece of flexible material to said member, a second cylindrical member carried by said first-named cylindrical member and telescoping within it, and a suitable spring or springs normally projecting said second cylindrical member beyond said first-named cylindrical member, whereby a suitable space is formed for the reception of a tie-wire.

7. In a device for applying end caps to cylindrical bales or the like, a movable circular member carried upon a suitable arm, means for actuating said movable member, a second circular member telescoping within the said first circular member, spiral springs interposed between said circular members, a funnel-shaped member carried on said first-named circular member, and spring-clamps for removably securing a piece of flexible material to said funnel-shaped member.

8. In a device for securing end caps to cylindrical bales and the like, a movable cylindrical member, means for actuating said movable member, a funnel-shaped member removably carried by said cylindrical member, suitable spring-clamps carried by said funnel-shaped member for removably securing a piece of flexible material to it, a second cylindrical member carried by said first-named cylindrical member and normally projecting beyond it, whereby a suitable space is formed for the reception of a tie-wire, and means for securing the loose ends of said tie-wire in position.

In testimony whereof I have hereunto set my hand and affixed my seal in the presence of the two subscribing witnesses.

JAMES F. SWINNERTON. [L. S.]

Witnesses:
J. W. LINDELEY,
HENRY D. LINDELEY.